(12) United States Patent
Sugawara et al.

(10) Patent No.: US 7,938,038 B2
(45) Date of Patent: May 10, 2011

(54) JOINT STRUCTURE OF ROBOT

(75) Inventors: Zenta Sugawara, Saitama (JP);
Kenichiro Sugiyama, Saitama (JP);
Masayoshi Kokushiyou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 963 days.

(21) Appl. No.: 10/585,000

(22) PCT Filed: Nov. 15, 2005

(86) PCT No.: PCT/JP2005/020932
§ 371 (c)(1),
(2), (4) Date: Jun. 29, 2006

(87) PCT Pub. No.: WO2006/064625
PCT Pub. Date: Jun. 22, 2006

(65) Prior Publication Data
US 2009/0173177 A1    Jul. 9, 2009

(30) Foreign Application Priority Data
Dec. 14, 2004   (JP) .................................. 2004-362065

(51) Int. Cl.
*B25J 17/00* (2006.01)
*B25J 17/02* (2006.01)
*B25J 18/00* (2006.01)
(52) U.S. Cl. ..................... 74/490.04; 74/490.06; 901/29
(58) Field of Classification Search ............... 74/490.01, 74/490.03, 490.05, 490.06, 421 A, 421 R; 901/19, 23, 27, 29
See application file for complete search history.

(56) References Cited

U.S. PATENT DOCUMENTS

| | | | |
|---|---|---|---|
| 4,300,362 A * | 11/1981 | Lande et al. | 464/117 |
| 4,511,305 A * | 4/1985 | Kawai et al. | 414/735 |
| 4,805,477 A | 2/1989 | Akeel | |
| 5,255,571 A | 10/1993 | Smith | |
| 5,732,599 A * | 3/1998 | Iriyama | 74/490.02 |

(Continued)

FOREIGN PATENT DOCUMENTS

| | | |
|---|---|---|
| EP | 0 180 558 | 5/1986 |
| EP | 0 200 105 | 11/1986 |

(Continued)

OTHER PUBLICATIONS

European Search Report for application No. 05807077.2-2316 PCT/JP2005020932 dated Jan. 23, 2008.

*Primary Examiner* — Justin Krause
(74) *Attorney, Agent, or Firm* — Squire, Sanders & Dempsey (US) LLP

(57) ABSTRACT

A joint structure of a robot for moving an assembly 51 to be connected to a robot link with respect to the robot link, the joint structure includes a first motor 10 for causing the assembly a longitudinal swing motion, a second motor 20 for causing the assembly a lateral swing motion, and a third motor 30 for causing the assembly a rotary motion, wherein the first motor 10 and the second motor 20 are disposed so that the output shaft of the first motor 10 and the output shaft of the second motor 20 are in parallel with each other and are orthogonal to the robot link, and the third motor 30 is disposed so that the output shaft of the third motor 30 is shifted with respect to the central axis of the rotary motion of the assembly 51.

2 Claims, 8 Drawing Sheets

| U.S. PATENT DOCUMENTS | | | |
|---|---|---|---|
| 5,765,443 A | 6/1998 | Murase et al. | |
| 5,797,900 A * | 8/1998 | Madhani et al. | 606/1 |
| 6,244,644 B1 * | 6/2001 | Lovchik et al. | 294/111 |
| 2003/0101838 A1 | 6/2003 | Shinozaki | |

| FOREIGN PATENT DOCUMENTS | | |
|---|---|---|
| EP | 0 658 405 A1 | 6/1995 |
| JP | 2003-170381 | 6/2003 |
| JP | 2004-141976 | 5/2004 |

* cited by examiner

← FINGERTIP SIDE    ELBOW SIDE →

JOINT STRUCTURE OF ROBOT

FIELD OF THE INVENTION

The present invention relates to a joint structure of a robot, specifically, relates to a joint structure, which is adopted as a joint of a robot and can shorten the length of a link.

RELEVANT ART

Conventionally, as an example of a joint structure of a wrist of a robot, the joint structure, which adopts a rotation motor and a feed screw mechanism etc for achieving a rotation in addition to a swing in a height direction and a swing in a sideward direction, has been discovered (see Japanese unexamined patent publication JP No. 2003-170381).

Hereinafter, the swing in a height direction is indicated as "longitudinal swing motion" and the swing in a sideward direction is indicated as "lateral swing motion".

In this joint structure, a first motor and a second motor are respectively disposed along an axis of an arm (link) so that a swing motion in a height direction and sideward direction is enabled. Thereby, the swing in a height direction and sideward direction of the wrist is enabled by changing the rotational motion given by each motor into a linear motion. Furthermore, a third motor is disposed on an axis of the arm in order to perform the rotary motion of the wrist. Thereby, three degree of freedom is enabled.

However, in the case of the joint structure which performs a longitudinal swing motion, a lateral swing motion, and a rotary motion using the rotation motor and the feed screw mechanism, the stroke of the feed screw and the length of the arm becomes long, when ensuring the wide actuation range. In this case, a load to be applied to the motor is increased due to the increasing of an inertia moment, and this provides a restriction on a design. Additionally, since the cover of the joint interferes with internal parts, e.g. a motor etc., when the actuation angle of the joint is determined to a wide range, the motion of the joint is disturbed.

Therefore, the joint structure, which is adopted for a robot and can shorten the length of the link with the sufficient actuation range, has been required.

DISCLOSURE OF THE INVENTION

The present invention relates to a joint structure of a robot for actuating an assembly being connected to a robot link. This joint structure includes a first motor for causing the assembly a longitudinal swing motion with respect to the robot link and a second motor for causing the assembly a lateral swing motion with respect to the robot link. In this joint structure, the first motor and the second motor are disposed so that the output shaft of the first motor and the output shaft of the second motor are in parallel with each other and are orthogonal to the robot link.

Here, the term "assembly" means an assembly of combined members, e.g. hand and arm etc that is joined to the robot link through a joint. The intermediate members, e.g. link, are incorporated in this "assembly" in addition to members disposed at a terminal which are joined to the link.

In this case, since the first motor for causing the assembly a longitudinal swing motion with respect to the robot link and the second motor for causing the assembly a lateral swing motion with respect to the robot link are disposed so that the output shaft of the first motor and the output shaft of the second motor are located in parallel with each other, the compact storage of the first motor and the second motor is enabled.

Additionally, since the first motor and the second motor are disposed so that the output shaft of the first motor and the output shaft of the second motor are located orthogonal to the robot link, the first motor and the second motor are stored along the direction orthogonal to the robot link. Thereby, the space efficiency in a longitudinal direction of the robot link is improved and the length of the link can be shortened.

In the present invention, additionally, it is preferable that a third motor which causes the assembly a rotary motion with respect to the robot link, is provided, and that the output shaft of the third motor is shifted by a predetermined amount with respect to the central axis of the rotary motion.

In this case, since the third motor, which provides the rotary motion of the assembly, is disposed so that the output shaft of the third motor is shifted by a predetermined amount with respect to the central axis of the rotary motion, while enabling the motion around three axes, the space is formed in the vicinity of the central axis of the rotary motion. Thereby, since this space can be used for the passage of the harness etc, the downsizing of the joint structure of the robot can be enabled.

In the present invention, still furthermore, it is preferable that a movable cover, which is rotatable with respect to at least one of the assembly and the robot link, and an elastic member, which generates a force between the movable cover and at least one of the assembly and the robot link to places the movable cover at a predetermined position, are provided.

In this case, the occurrence of the inhibition of the motion of the assembly due to the contact with the internal components within the joint and the movable cover, by providing the movable cover on the joint.

Additionally, since the elastic member, which moves the movable cover to the predetermined position, is provided, the internal components, e.g. the motor and the link mechanism etc, can be covered with the movable cover. Thereby, since the exposure of the internal components is prevented, the intrusion of foreign objects into the joint can be prevented.

According to the present invention, since the length of the link can be shortened while securing the moveable range, the joint structure of the robot that has a compact size can be realized.

DETAILED DESCRIPTION OF THE PREFERRED EMBODIMENT

Figure 1:
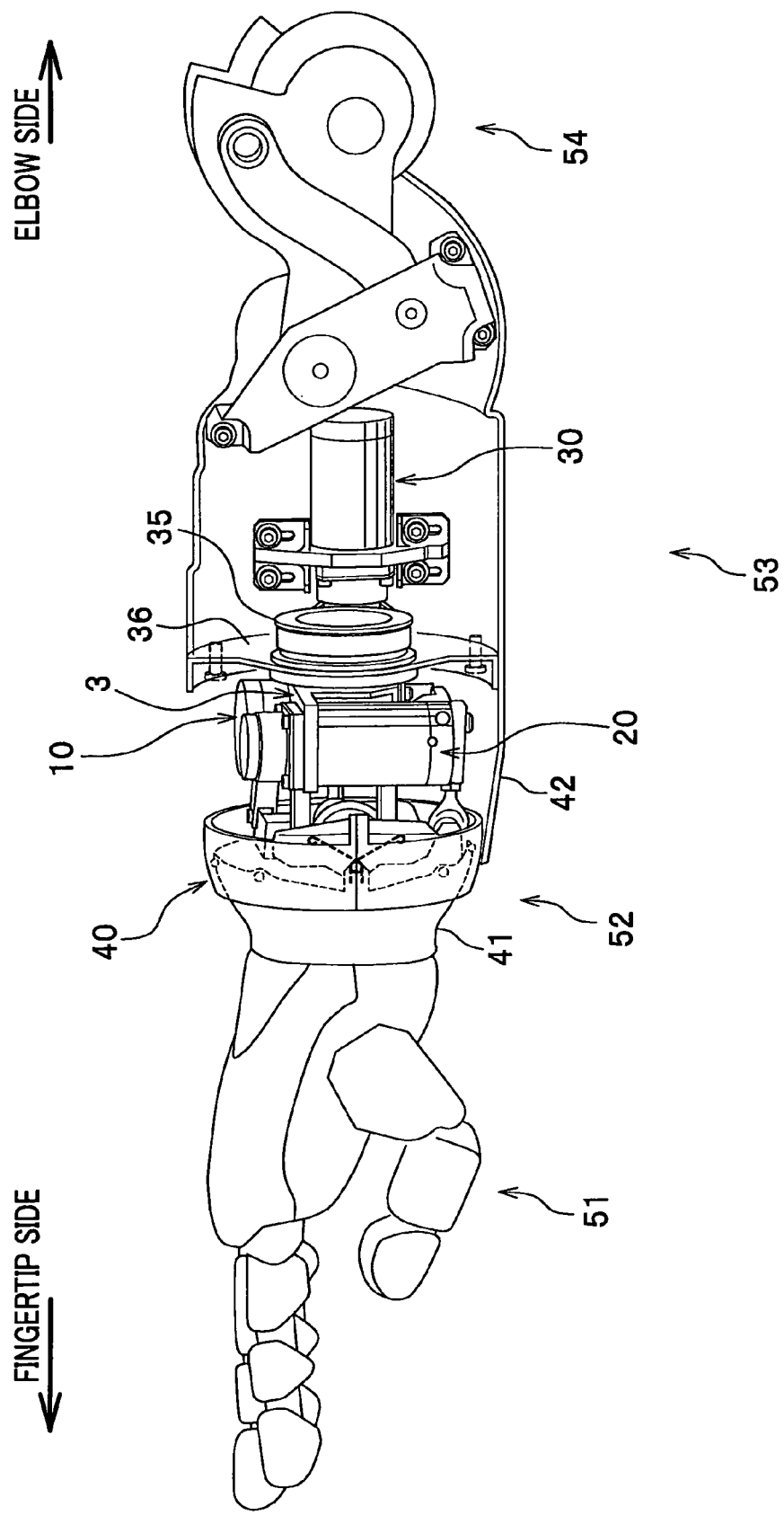
FIG. 1 is a perspective view showing the overall mechanism of the joint structure of a robot according to the embodiment of the present invention.

Next, the embodiment of the present invention will be explained with reference to attached drawings. Here, in the drawings, a part of the constituents, e.g. an arm cover and etc, may be omitted for convenience of the explanation.

In the present embodiment, the explanation of the joint structure of a robot according to the present invention will be carried out using the joint structure applied for a wrist of a humanoid-type robot as an example.

However, the present invention is not limited to the following embodiments, and the joint structure may be applied for an ankle of a humanoid-type robot or for a connection part of a link in a robot of industrial use.

In the following explanation, the direction of a finger tip in FIG. 1 is denoted as fingertip side, the direction of an elbow is denoted as elbow side, the direction of upper side in FIG. 1 is denoted as upper side, the direction of lower side in FIG. 1 is denoted as lower side, the direction of front side from page in FIG. 1 is denoted as left side, and the direction of back-side in FIG. 1 is denoted as right-side.

Firstly, the overall constitution of the joint structure of the robot according to this embodiment will be explained with reference to FIG. 1.

FIG. 1 is an explanatory view for explaining the joint structure of the robot according to the present embodiment. In FIG. 1, a hand 51 which is an assembly of parts constituting a hand, a wrist 52 which joins the hand 51 and an arm 53 while allowing the turn around the wrist 52, the arm 53 which serves as an robot-link, and an elbow 54, are indicated.

As shown in FIG. 1, the joint structure of the robot according to the present embodiment is a joint structure of a wrist 52 in the humanoid-type robot. This joint structure is composed of a first motor 10 for a longitudinal swing motion of the hand 51, a second motor 20 for a lateral swing motion of the hand 51, a third motor 30 for a rotary motion of the hand 51, and a movable cover 40 covering the joint of the wrist 52.

In other words, the first motor 10 swings the hand 51 around a first axis orthogonal to the central axis of the arm 53. The second motor 20 swings the hand 51 around a second axis, which is orthogonal to the first axis and cross the first axis on the center axis of the arm 53. The third motor 30 rotates the hand 51 around the central axis of the arm 53. Here, the central axis of the arm 53 is an axis which passes the center of the arm 53 and elongates in a longitudinal direction of the arm 53. In the following explanation, the central axis of the arm 53 is also called as the rotation axis of a rotary motion of the hand Firstly, the layout of the motor which provides a driving force to the joint structure of a robot will be explained.

The first motor 10 and the second motor 20 are disposed side by side so as to be in parallel to each other on both sides (left-and-right side) with respect to the central axis of the arm 53. The first motor 10 and the second motor 20 are disposed so that the output axis of each of the first motor 10 and the second motor 20 is directed in an ups-and-downs direction. In this embodiment, the first motor 10 and the second motor 20 are respectively positioned in the right side and left side of the central axis of the arm 53.

Furthermore, the third motor 30 is positioned backward (in an elbow-side) of the first motor 10 and the second motor 20, and an output shaft of the third motor 30 is disposed in a right side with respect to the rotation axis, which is an rotation axis of a rotary motion of the hand.

In the present embodiment, for explaining the motion of the joint structure of the wrist, the indication of other components, e.g. a control mechanism and a harness etc, is omitted in this figure.

Figure 2:
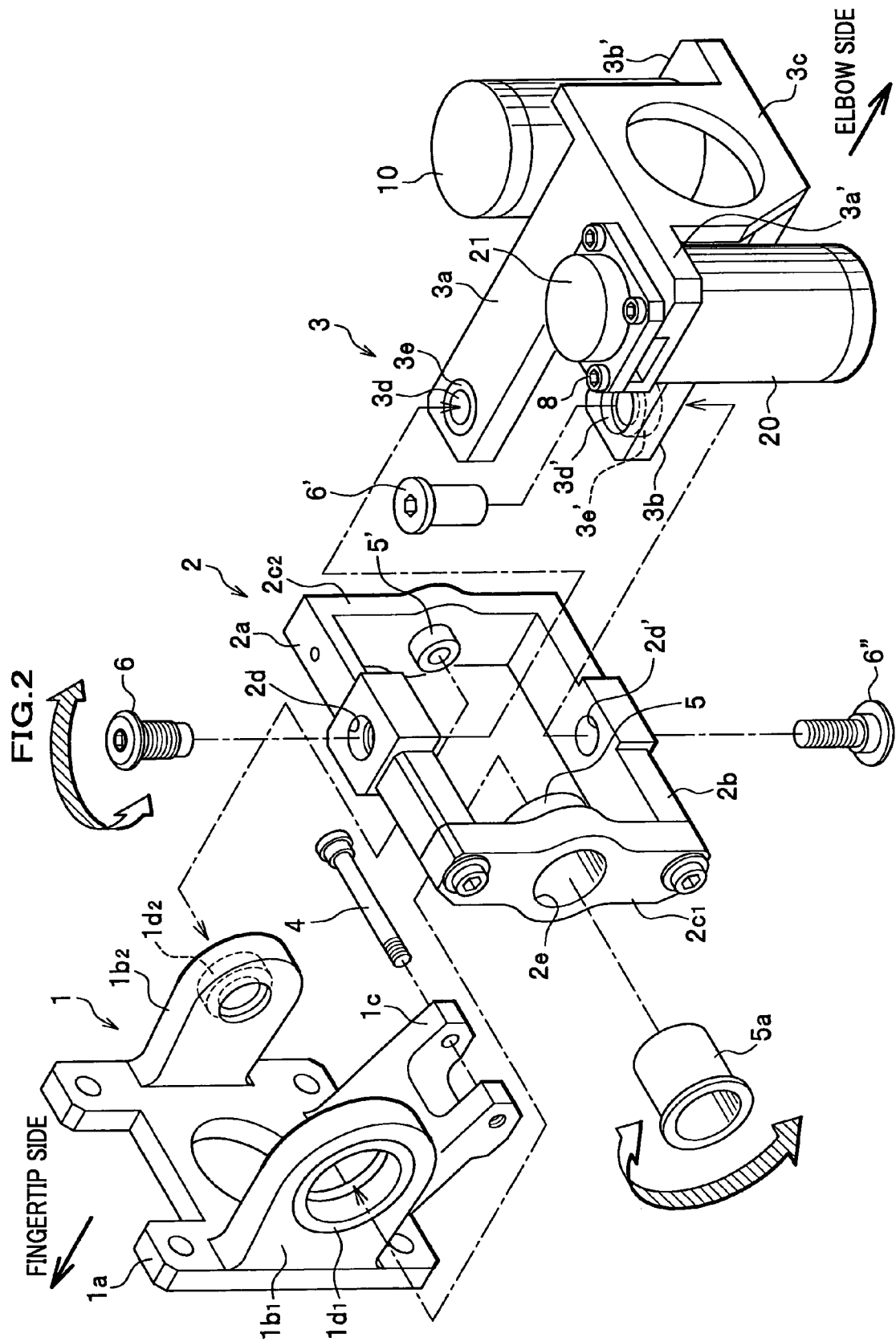
FIG. 2 is an exploded perspective view for explaining an overall actuation around three axes of the joint structure of a robot according to the embodiment of the present invention.

As shown in FIG. 2, the joint structure of the wrist according to this embodiment includes a longitudinal rotary unit 1 for a longitudinal swing motion, a lateral rotary unit 2 for a lateral swing motion, a motor mount 3 which connects with the longitudinal rotary unit 1 and lateral rotary unit 2 and enables the rotary motion of the longitudinal rotary unit 1 and lateral rotary unit 2, and a driven pulley 35 (see FIG. 1).

To be more precise, the longitudinal rotary unit 1 and lateral rotary unit 2 are disposed at a fingertip side of the arm 53. The first motor 10 and second motor 20, which are aligned along a left-and-right direction on the motor mount 3, are disposed behind the longitudinal rotary unit 1 and lateral rotary unit 2. As shown in FIG. 1, the motor mount 3 is fixed to the driven pulley 35, which is supported by a rib 36 while allowing the rotation thereof.

As shown in FIG. 2, the longitudinal rotary unit 1 includes a base plate 1a having a round-shaped through hole at the center thereof, side-brackets 1b1 and 1b2 disposed on both sides of the base plate 1a, an arm 1c which elongates in an obliquely downward direction from the bottom side of the base plate 1a, and a connection pin 4 which serves as a hinge of the arm 1c.

The lateral rotary unit 2 is a rectangle-shaped member formed by connecting both ends of the approximate U-shaped member with a left-side frame 2c1. Here, the approximate U-shaped member comprises an upper-side frame 2a, a lower-side link 2b, and a right-side frame 2c2 and is formed into an integral shape by these members. An opening at the center of the lateral rotary unit 2 is adapted to pass or dispose therein supplementary parts, i.e. a harness etc.

A center hole 2d and 2d' is formed on the upper-side frame 2a and the lower-side link 2b, respectively. A lateral rotation axis 6 and 6', which serves as a rotation support of the lateral swing motion, is inserted to each center hole 2d and 2d'. A longitudinal rotation axis 5 and 5', which serves as a rotation support of the longitudinal swing motion and elongates inward, is provided on the right-side frame 2c2 and the left-side frame 2c1, respectively. Here, the line connecting lateral rotation axes 6 and 6' corresponds to the above-described second axis, and the line connecting longitudinal rotation axes 5 and 5' corresponds to the above-described first axis.

A through hole 2e is provided on the longitudinal rotation axis 5 of the left-side frame 2c1, and a harness guide 5a is inserted into this through hole 2e.

Here, a longitudinal rotary unit 1 is pivotably supported by the left-side frame 2c1 and the right-side frame 2c2.

That is, the longitudinal rotary unit 1 is supported by the longitudinal rotation axis 5 and 5', which are formed on the left-side frame 2c1 and the right-side frame 2c2, respectively, through the bearing 1d1 and 1d2. Thereby, the longitudinal rotary unit 1 is allowed to turn around the longitudinal rotation axis 5 and 5' and provide the longitudinal swing motion.

The motor mount 3 comprises an upper flange 3a, a lower flange 3b, and a connection plate 3c. The upper flange 3a and lower flange 3b are arranged in parallel, and are connected each other by the connection plate 3c. The motor mount 3 is formed into an integral shape having an approximate U-like shape in a side-viewing from the upper flange 3a, the lower flange 3b, and the connection plate 3c.

A central hole 3d and 3d', which serves as the rotation center of the lateral swing motion, is formed at an end in a fingertip side of the upper flange 3a and the lower flange 3b, respectively. The central hole 3d and 3d' is formed along an ups-and-downs direction, and passes through the upper flange 3a and lower flange 3b, respectively. The bearing 3e and 3e', which supports the lateral rotation axis 6 and 6', is provided within the central hole 3d and 3d', respectively. In this embodiment, additionally, the lateral rotation axis 6 is directly screwed into the upper-side frame 2a, and the lateral rotation axis 6' is fixed to the lower-side link 2b using a screw 6".

The second motor mount 3a' is formed on the rear-end (an elbow-side) of the upper flange 3a so that the second motor mount 3a' extends into a left side. The first motor mount 3b' is formed on the rear-end (an elbow-side) of the lower flange 3b so that the first motor mount 3b' extends into a right side. That is, the second motor mount 3a' and the first motor mount 3b' extend in an opposing direction each other. The second motor 20 is disposed on the second motor mount 3a' using bolts 8 so that a reduction unit 21 is positioned in an upper-side. The first motor 10 is disposed on the first motor mount 3b' so that a reduction unit 11 (not shown) is positioned in a lower-side.

As described above, since the longitudinal rotary unit 1 is joined to the left-side frame 2c1 and right-side frame 2c2 of the lateral rotary unit 2 so that the rotation around the longitudinal rotation axis 5 and 5' is allowed, the longitudinal swing motion of the longitudinal rotary unit 1 is enabled.

Additionally, since the lateral rotary unit 2 is joined to the motor mount 3 so that the rotation around the lateral rotation axis 6 and 6' is allowed, the lateral swing motion of the lateral rotary unit 2 is enabled.

As mentioned above, furthermore, since the motor mount 3 is fixed to the driven pulley 35, which is rotatably supported by the rib 36 (see FIG. 1), the rotary motion of the motor mount 3 in accordance with the rotation of the motor mount 3 is enabled.

Next, the explanation about the mechanism for controlling each of the above explained motion (the longitudinal swing motion, the lateral swing motion, and the rotary motion) will be carried out.

Figure 3:
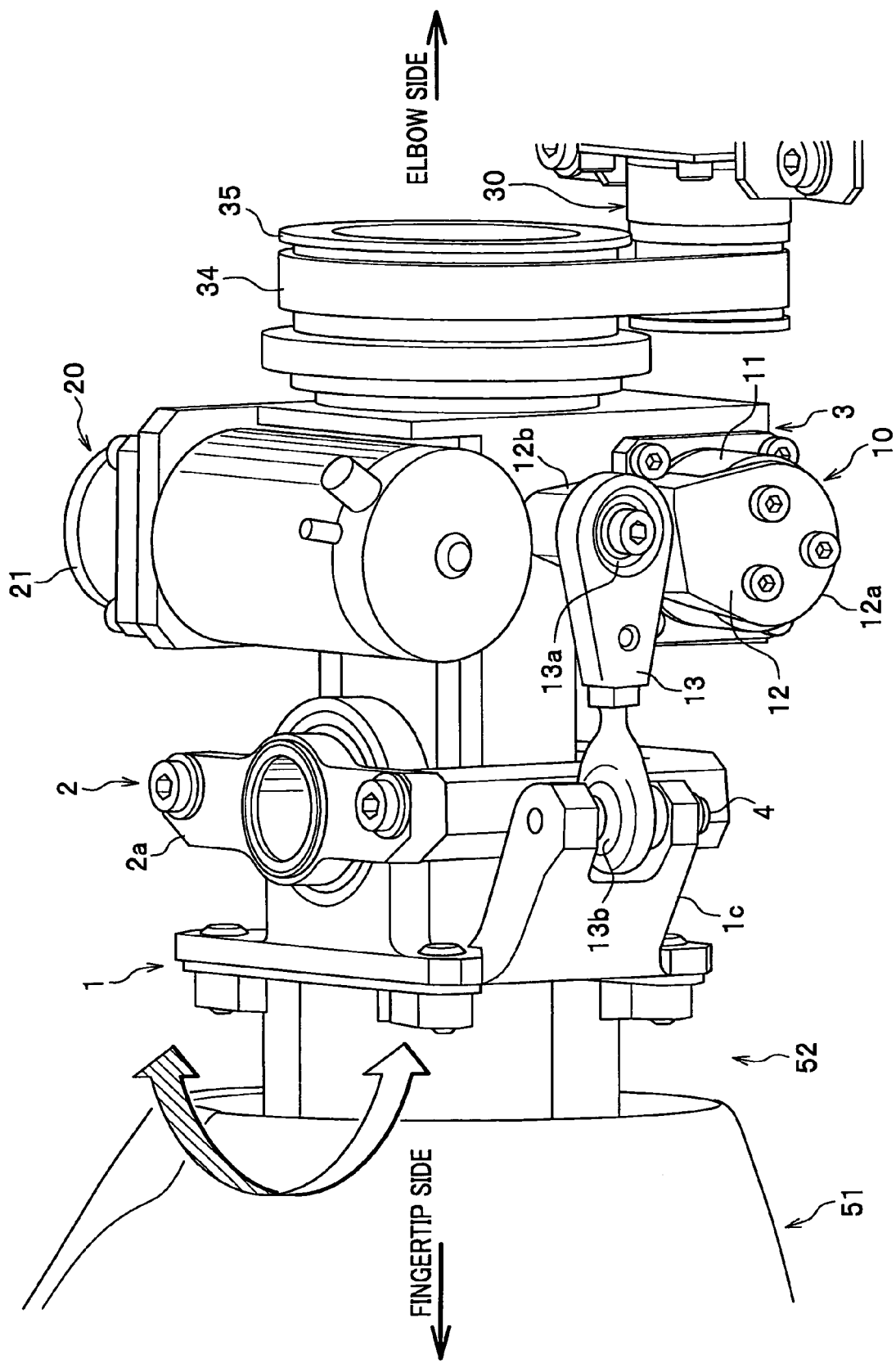
FIG. 3 is a partially enlarged perspective view, which is looked from a lower-side in FIG. 1 and which is used for the explanation of a longitudinal swing motion of the joint structure of the robot according to the embodiment of the present invention.

As shown in FIG. 3, the mechanism for controlling the swing in a height direction (longitudinal swing motion) includes the first motor 10 as power source, a swing lever 12 being connected to the reduction unit 11 of the first motor 10, a spherical joint 13 being connected to the swing lever 12, and the longitudinal rotary unit 1 being connected to the spherical joint 13. The first motor 10 is positioned on a right side with respect to the central axis of the arm 53 and is disposed on the motor mount 3 so that the reduction unit 11, which connects with an output shaft of the first motor 10, is in a lower side.

The swing lever 12 connects with the reduction unit 11 of the first motor 10 at the base-end 12a thereof and provides an integral body together with the reduction unit 11. Additionally, the swing lever 12 rotatably connects with one end of the spherical joint 13 through a spherical bearing 13a having a self-aligning function. The other end of the spherical joint 13 rotatably connects with the connection pin 4 disposed on the arm 1c of the longitudinal rotary unit 1 though the spherical bearing 13b.

Figure 5:
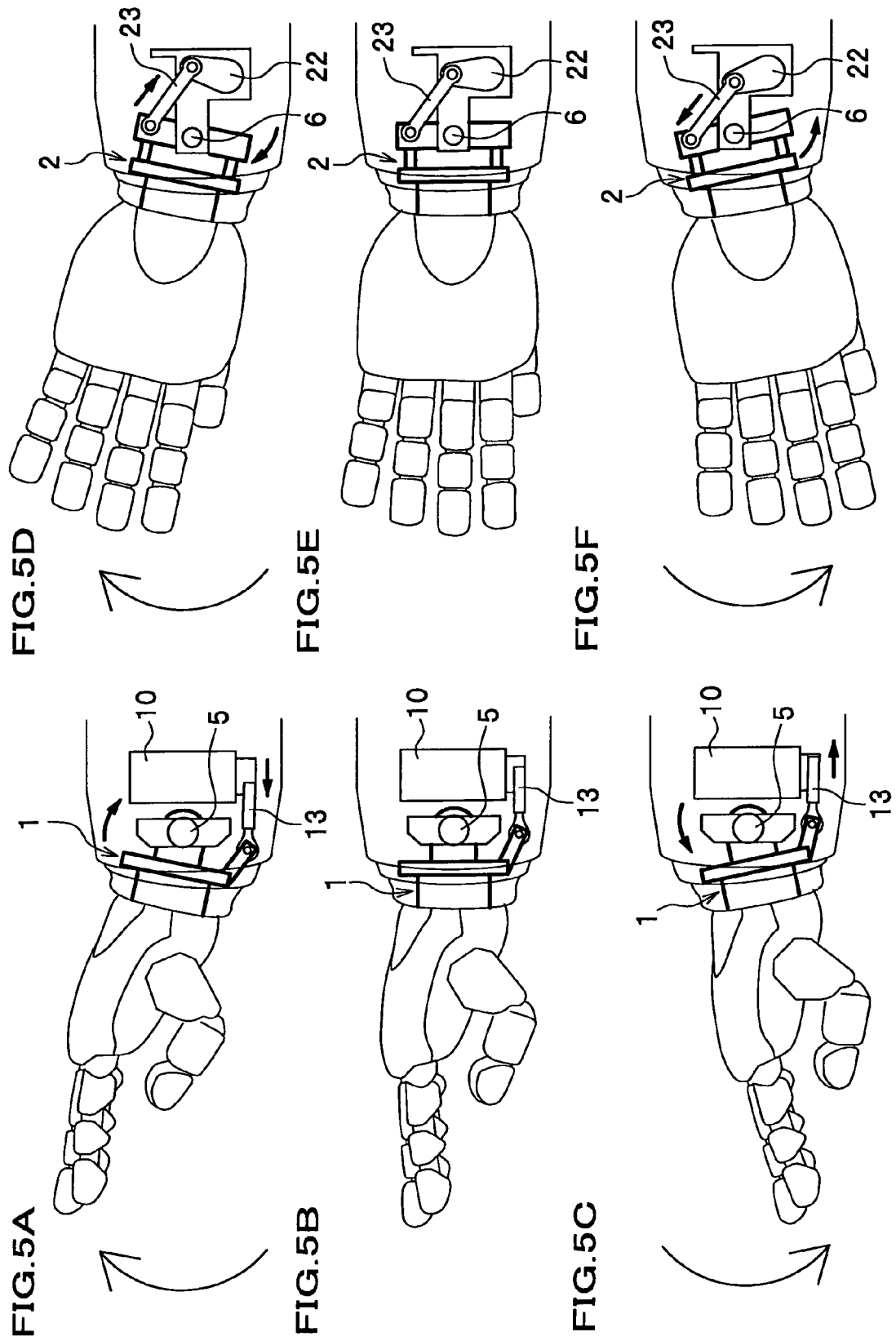
FIG. 5A is a front view of a wrist for explaining the longitudinal swing motion of the joint structure of the robot according to the embodiment of the present invention.
FIG. 5B is a front view of a wrist for explaining the longitudinal swing motion of the joint structure of the robot according to the embodiment of the present invention.
FIG. 5C is a front view of a wrist for explaining the longitudinal swing motion of the joint structure of the robot according to the embodiment of the present invention.
FIG. 5D is a plane view of a wrist for explaining the lateral swing motion of the joint structure of the robot according to the embodiment of the present invention.
FIG. 5E is a plane view of a wrist for explaining the lateral swing motion of the joint structure of the robot according to the embodiment of the present invention.
FIG. 5F is a plane view of a wrist for explaining the lateral swing motion of the joint structure of the robot according to the embodiment of the present invention.

In this embodiment, as shown in FIG. 5A to FIG. 5C, the rotation (torque) of the output shaft of the first motor 10 is transmitted to the reduction unit 11 and is changed to the swing motion (reciprocating motion) of the swing lever 12. Then, this swing motion is transmitted to the longitudinal rotary unit 1 through the spherical joint 13, and turns the longitudinal rotary unit 1 around the longitudinal rotation axis 5 and 5'. Here, since the hand 51 is fixed to the longitudinal rotary unit 1, the longitudinal swing motion of the hand 51 can be achieved in accordance with the turn of the longitudinal rotary unit 1.

In the present embodiment, additionally, the spherical joint is used. But, a universal joint etc can be used instead of the spherical joint.

Figure 4:
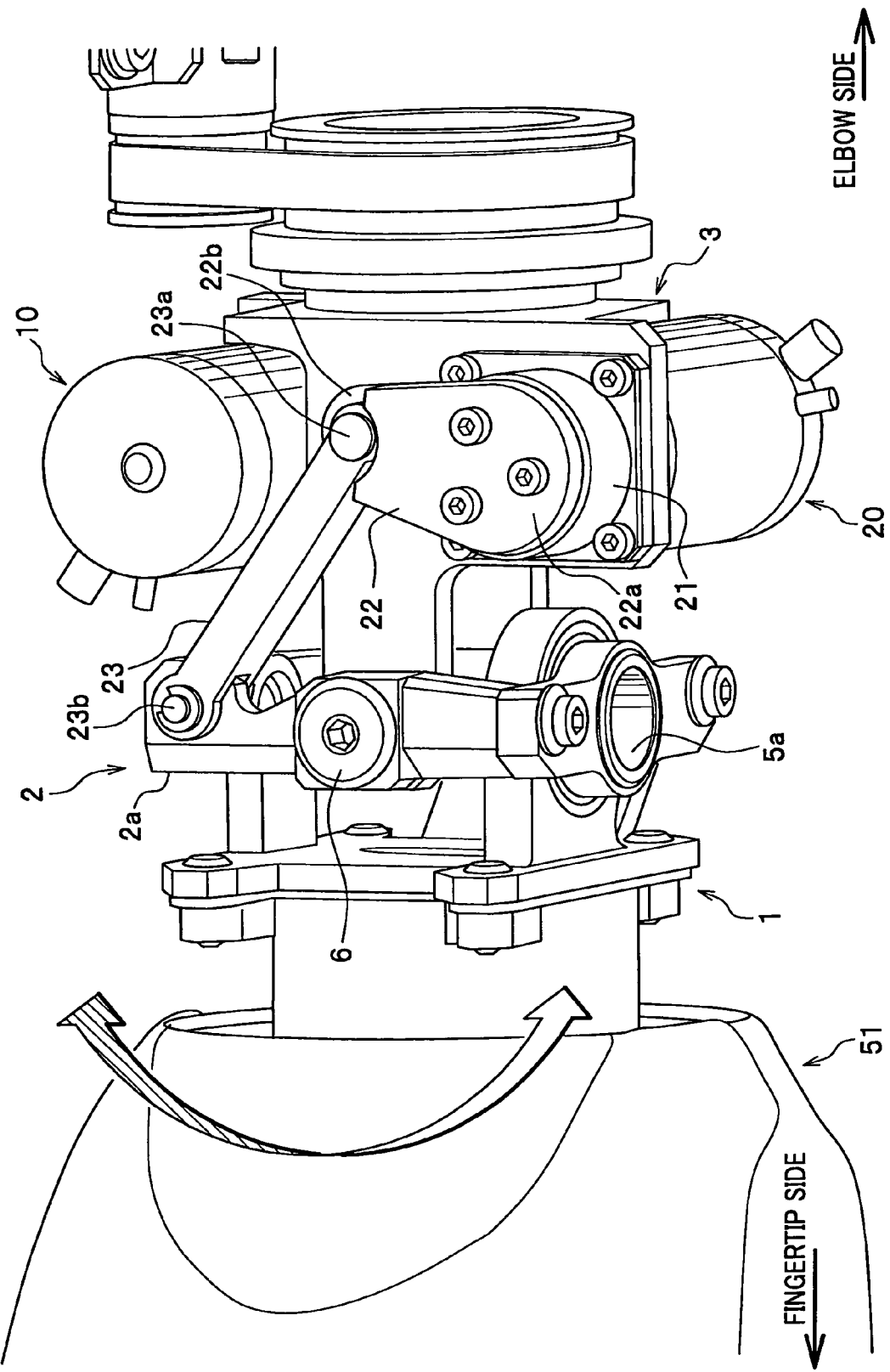
FIG. 4 is a partially enlarged perspective view, which is looked from an upper-side in FIG. 1 and which is used for the explanation of the lateral swing motion of the joint structure of the robot according to the embodiment of the present invention.

As shown in FIG. 4, on the other hand, the mechanism for controlling the swing in a sideward direction (lateral swing motion) includes a second motor 20 as power source, a swing lever 22 which is connected to an outputs-side of the reduction unit 21 of the second motor 20 and provides an integral body, a rod 23 which rotatably connects with this swing lever 22, and the lateral rotary unit 2 which rotatably connects with the rod 23. The second motor 20 is positioned on a left side with respect to the central axis of the arm 53 and is disposed on the motor mount 3 so that the output side of the reduction unit 21, which connects with an output shaft of the second motor 20, is in an upper side.

The swing lever 22 is fixed to the output shaft of the reduction unit 21 of the second motor 20 at a base-end 22a thereof, and connects with one end 23a of the rod 23 at tip side 22b thereof. The other end 23b of the rod 23 is rotatably connected to the left-side frame 2c1 of the lateral rotary unit 2.

In this embodiment, as shown in FIG. 5D to FIG. 5F, the rotation (torque) of the output shaft of the second motor 20 is transmitted to the reduction unit 21 and is changed to the swing motion (reciprocating motion) of the swing lever 22. Then, this swing motion is transmitted to the lateral rotary unit 2 through the rod 23, and turns the lateral rotary unit 2 around the lateral rotation axis 6 and 6'.

Here, since the hand 51 connects with the lateral rotary unit 2 through the longitudinal rotary unit 1, the lateral swing motion of the hand 51 can be achieved in accordance with the turn of the lateral rotary unit 2.

In the present embodiment, additionally, the mechanism for controlling the swing in a height direction (longitudinal swing motion) and the swing in a sideward direction (lateral swing motion) is represented by a link mechanism using a lever and a joint. However, present invention is not limited to this embodiment, and may be represented by using various types of tools, e.g. a gear, a belt or etc.

Figure 6:
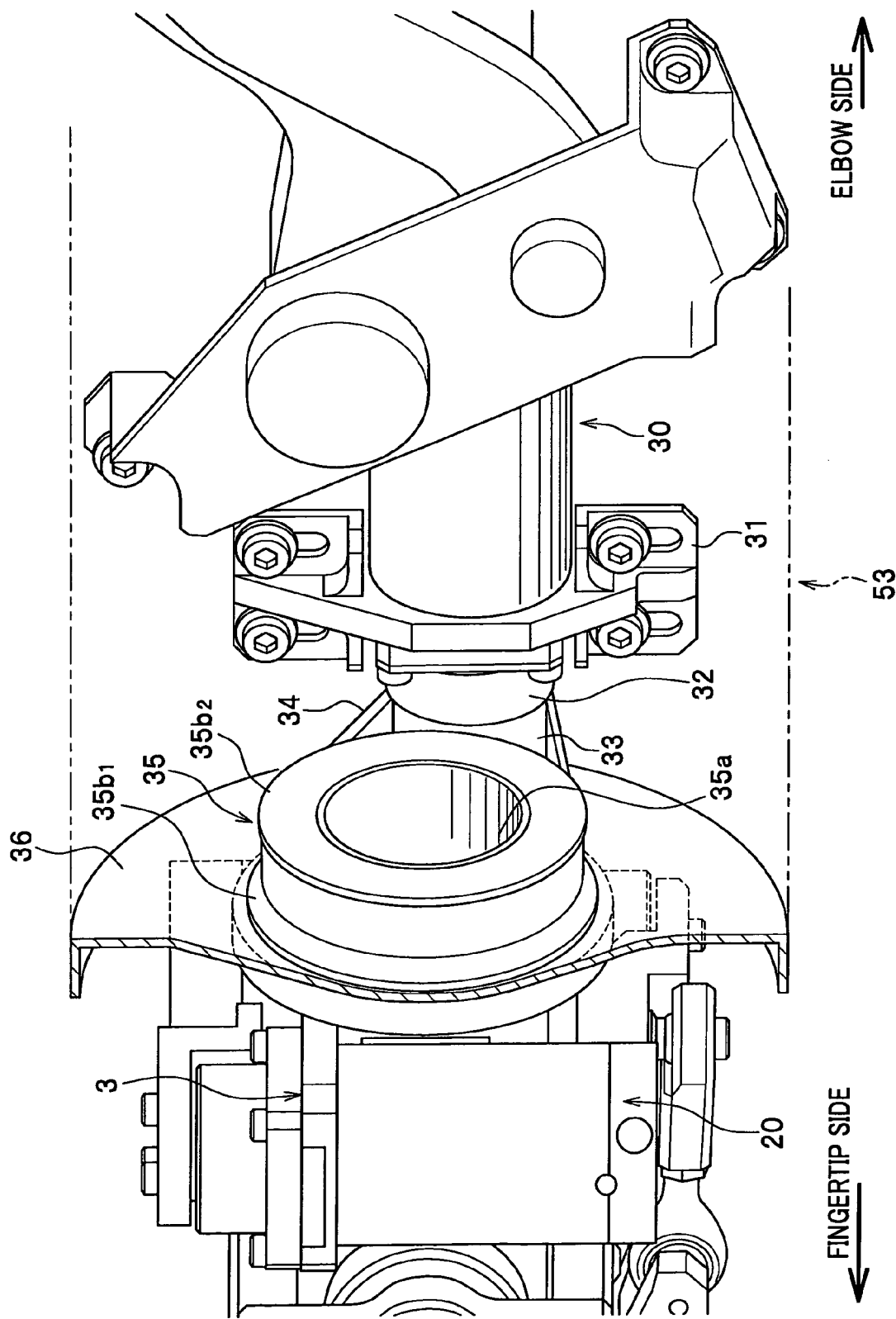
FIG. 6 is a partially enlarged perspective view for explaining the rotary motion of the joint structure of the robot according to the embodiment of the present invention.

As shown in FIG. 6, the rotary mechanism includes a third motor 30 as power source, an output pulley (motor side pulley) 33 fixed to the output shaft of a reduction unit 32, a belt 34, a driven pulley 35, and a rib 36.

The third motor 30, for example, is disposed so that the output shaft thereof is in a right side with respect to the rotation axis of the rotary motion (rotation axis of the driven pulley 35). Additionally, the output shaft of the third motor 30 is disposed in parallel to the rotation axis of the rotary motion.

The reduction unit 32 is joined to the output shaft of the third motor 30 and provides an integral body together with the third motor 30, and the output pulley 33 is fixed to this reduction unit 32. In this embodiment, the belt 34 is put around the output pulley 33 and driven pulley 35 so that the rotation of the output pulley 33 is transmitted to the driven pulley 35. In this embodiment, therefore, the driven pulley 35 is rotated in accordance with the rotation of the output pulley 33.

The driven pulley 35 is a cylindrical shaped member having the hollow section 35a at an inside thereof. A flange 35b1 and flange 35b2 are provided at ends in a fingertip-side and elbow-side of the driven pulley 35, respectively, so as to guide the rotation of the belt 34 while keeping the belt 34 between flanges 35b1 and 35b2. The driven pulley 35 is rotatably supported by the rib 36, which is disposed along an orthogonal direction with respect to the arm 53, through a bearing etc.

Thereby, the rotation (torque) of the third motor 30 is reduced by the reduction unit 32 and is transmitted to the driven pulley 35 from the output pulley 33 using the belt 34 for rotating the driven pulley 35. Here, the motor mount 3 is fixed to the fingertip side's end of the driven pulley 35. Thus, the rotary motion of the hand 51 connected to the motor mount 3 through the lateral rotary unit 2 and longitudinal rotary unit 1 can be achieved, by rotating the motor mount 3 using the driven pulley 35.

The joint structure of the robot of the present embodiment, as shown in FIG. 1, includes a wrist cover 41 being fixed to the hand 51, and an arm cover 42 as the outer shell of the arm 53, and a movable cover 40 disposed between the wrist cover 41 and the arm cover 42 as if connecting the wrist cover 41 and the arm cover 42.

Figure 7:
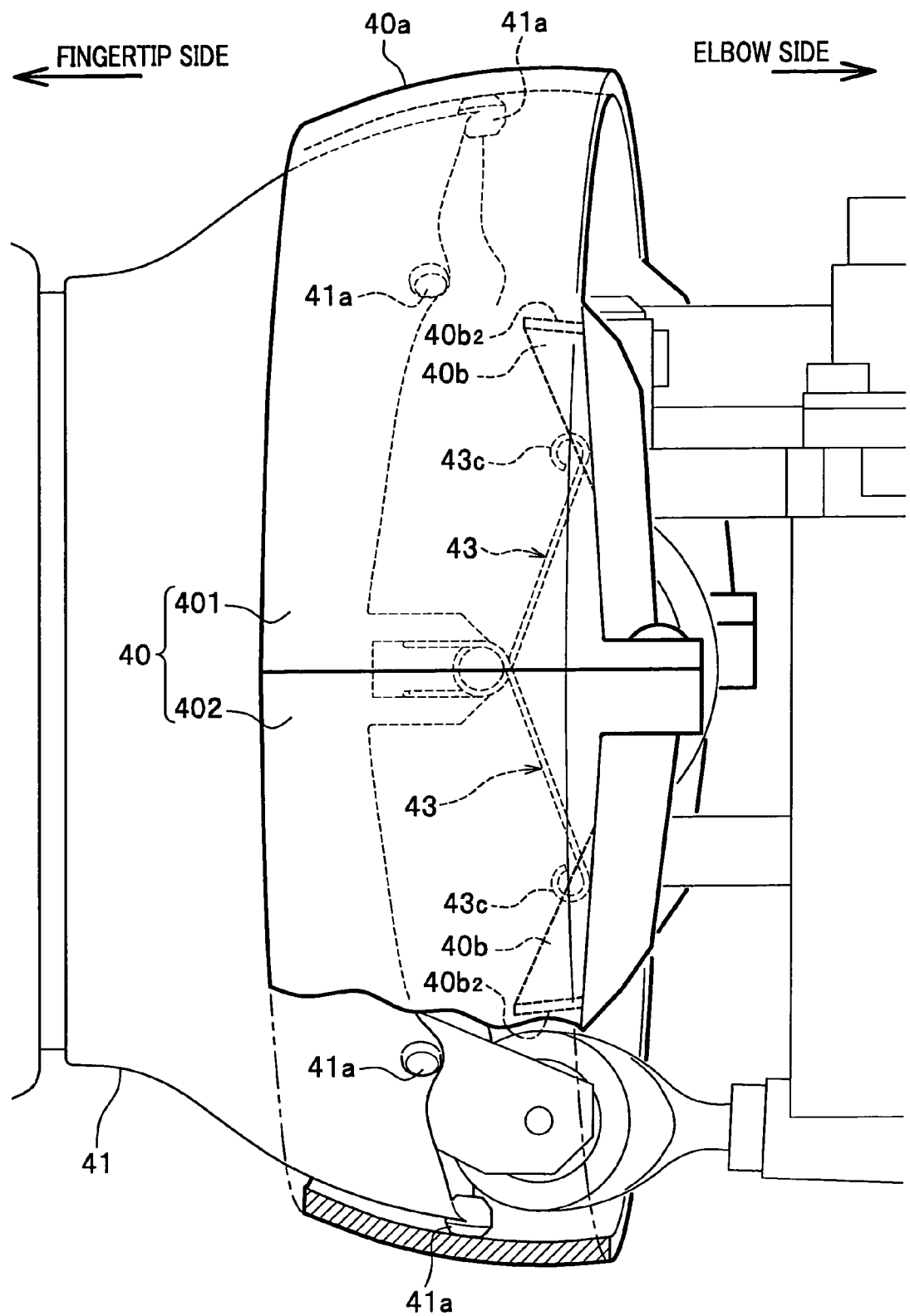
FIG. 7 is an explanatory view for explaining the installation of the movable cover attached to the joint of the joint structure of the robot according to the embodiment of the present invention.

The movable cover 40, as shown in FIG. 7, is attached to the outside periphery of the wrist cover 41. In this embodiment, for example, the movable cover 40 is held on the wrist cover 41 using latches 41a, e.g. 6 latches, which are provided around the wrist cover 41.

The movable cover 40 has a cylindrical shape with short length so that part of the outside periphery of the wrist cover 41 is covered with the movable cover 40, and a curvature is formed along a fore-and-rear direction of the movable cover 40. In this embodiment, the curvature in the elbow side of the movable cover 40 is large, and the curvature in the fingertip side of the movable cover 40 is slightly smaller than that in the elbow side. In FIG. 7, only left side with respect to the central axis of the arm 53 (see FIG. 1) is indicated. But the constitutions in a right side are the same constitution as that in a left side.

Figure 8:
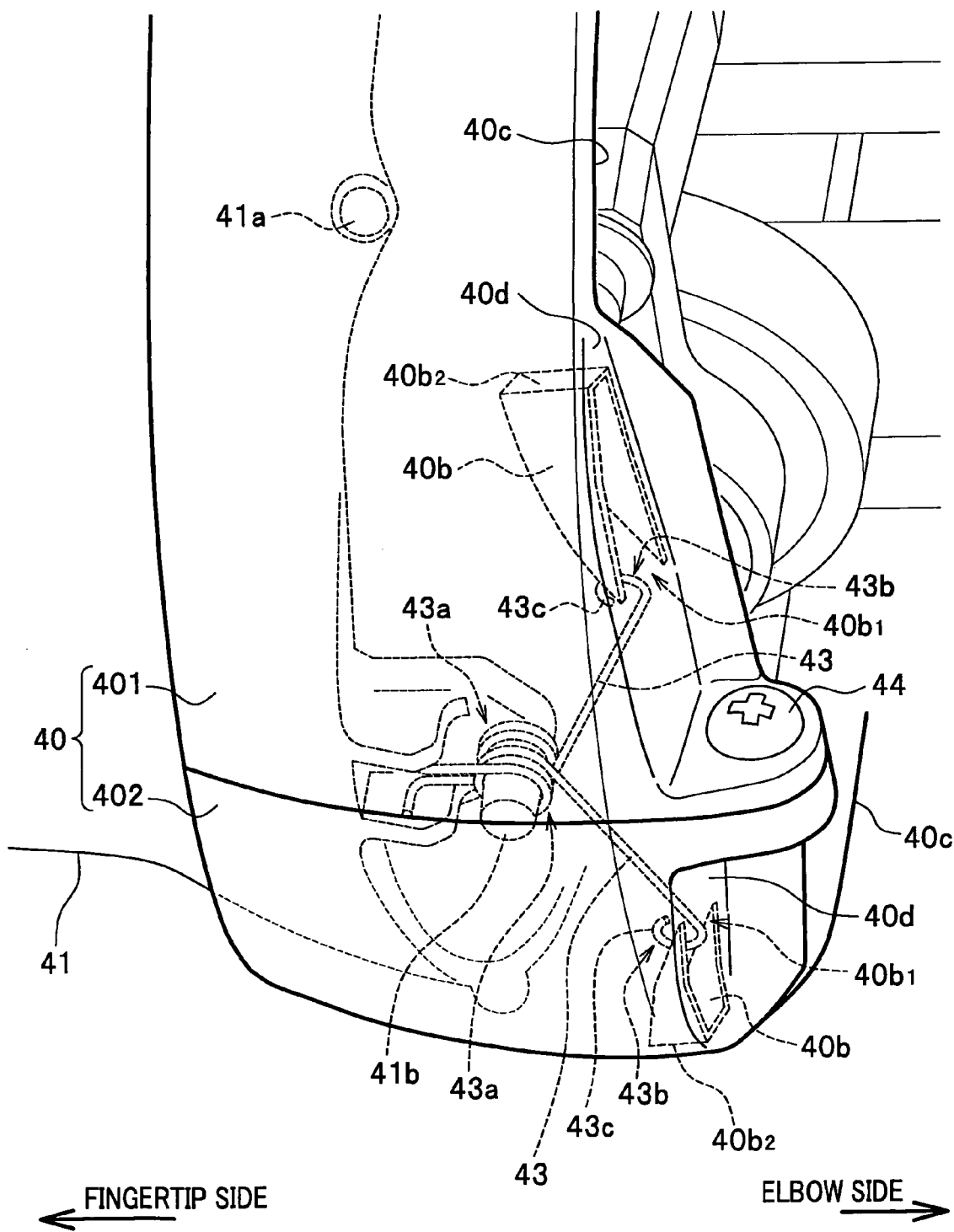
FIG. 8 is an explanatory view for explaining the constitution of the movable cover attached to the joint of the joint structure of the robot according to the embodiment of the present invention.

In this embodiment, as shown in FIG. 8, the movable cover 40 comprises a movable cover 401 and a movable cover 402. The movable cover 401 and the movable cover 402 are positioned in an upper-side and a lower-side, respectively, and are joined each other using a screw 44 to provide an integral body.

Flat areas 40d and 40d are provided on movable covers 401 and the movable cover 402, respectively. The position where the flat area 40d is provided is an outside in an elbow side's periphery 40c of the movable cover 40. Flat areas 40d and 40d extend along an axial direction of the screw 44, and are positioned at opposite sides across the joint surface between movable covers 401 and 402.

Spring stopper 40b and 40b, on the other hand, is provided on the movable cover 401 and 402, respectively. The position where the spring stopper 40b is provided is an inside of the elbow side's periphery 40c of the movable cover 40. The spring stopper 40b has a triangular shape in a front viewing, and protrudes in a fingertip side from the inside surface of the flat area 40d. A space 40b1 storing therein a torsion coil spring 43 is formed on the spring stopper 40b.

In the present embodiment, the torsion coil spring 43 is adopted as an example of the "elastic member", and the movable cover 40 is rotatably fixed to the wrist cover 41 through the torsion coil spring 43.

The torsion coil spring 43, as shown in FIG. 8, comprises a center section 43a and an end section 43b, and the center section 43a is spiraled to provide a coil-like shape. In this embodiment, two torsion coil springs 43 are used, and each end section 43b of two torsion coil springs 43 protrudes from the center section 43a so as to figure a v-shape in a side viewing from end sections 43a.

The center section 43a of each torsion coil spring 43 is fitted on a knob 41b formed on the wrist cover 41 to support the torsion coil spring 43 by the knob 41b. Each curled end 43c and 43c of the torsion coil spring 43 is pushed against the flat area 40d of the movable cover 40 and applies a force directing from a fingertip side to an elbow side.

In this embodiment, the torsion coil spring 43 causes elastic force narrowing the angle θ between end sections 43b and 43b and pushes the back-side surface of each of the flat areas 40d and 40d by the curled end 43c and 43c. Furthermore, the movable cover 40 is held on the wrist cover 41 by the contact between the inner periphery of the movable cover 40 and latches 41a formed on the wrist cover 41.

In this embodiment, additionally, the torsion coil spring 43 is adopted. But, a helical compression spring and an elastic string etc may be adoptable instead of the torsion coil spring. In this embodiment, furthermore, the movable cover 40 is provided on the side of the hand 51 (assembly) using the elastic member (torsion coil spring 43). But, the movable cover 40 may be provided on the side of the arm 53 (robot link) or may be provided on the both sides of the hand 51 and the arm 53.

The function of the joint structure of the wrist of the robot will be explained with reference to FIG. 1 and FIG. 2.

In this embodiment, the rotation mechanism comprising the longitudinal rotary unit 1, the lateral rotary unit 2, and the motor mount 3 being connected to the driven pulley 35 is provided. Thereby, the joint structure of this embodiment provides three degree of freedom, e.g. a longitudinal swing motion, a lateral swing motion, and a rotary motion, by the first motor 10, the second motor 20, and the third motor 30, respectively.

Additionally, the first motor 10 and the second motor 20 are disposed linearly along a left-and-right direction of the arm 53 so that the output axis of each of the first motor 10 and the second motor 20 is directed in an ups-and-downs direction.

Thereby, since the first motor 10 and the second motor 20 are disposed linearly along a left-and-right direction so that the output axis of each of the first motor 10 and the second motor 20 is directed in an ups-and-downs direction, an inertia moment around the elbow 54 can be reduced.

In this invention, since the third motor 30 is disposed so that the third motor 30 is shifted from the central axis of the rotary motion, a space is ensured in the vicinity of the central axis of the rotary motion. Thereby, the provision of the harness in the vicinity of the central axis of the rotary motion is enabled.

To be more precise, the harness can be passed from the elbow 54 to the wrist 52 through the vicinity of the third motor 30, a hollow section 35a (see FIG. 6) formed at the inside-periphery of the driven pulley 35, the clearance between the first motor 10 and the second motor 20, and the openings formed at the center of each of the longitudinal rotary unit 1 and the lateral rotary unit 2.

In this embodiment, as described above, the harness can be passed near the central axis of the longitudinal swing motion, the lateral swing motion, and the rotary motion. Thereby, the restriction in an actuation angle of the hand due to the harness can be minimized, and the occurrence of the breakage of the harness can be prevented.

In the present embodiment, additionally, a through hole 2e is provided on the left-side frame 2c1 of the lateral rotary unit 2 to ensure the passage for the harness that is used when installing the harness to the tip of the hand.

Additionally, the function of the movable cover 40 will be explained with reference to FIG. 7 and FIG. 8.

In this embodiment, the flat area 40d is pushed to an elbow side from a fingertip side, by the curled end 43c of the torsion coil spring 43. Also, latches 41a formed on the wrist cover 41 are contactable with the inner circumference of the movable cover 40. Thereby, the movable cover 40 is held on the wrist cover 41 while allowing the rotation around the wrist cover 41 of the movable cover 40.

Therefore, the movable cover 40 begins to rotate in accordance with the turn of the hand 51. In this case, the turn of the hand 51 is not disturbed even if the movable cover 40 contacts with internal parts, e.g. motor etc. This is because the torque of the hand 51 exceeds the elastic force given by the torsion coil spring 43 and enables the further turn of the hand 51 from the position, where the turn of the hand 51 is disturbed due to the contact with internal parts of the hand 51.

Thereby, the occurrence of the inhibition of the turn of the hand 51 due to the contact with the movable cover 40 can be prevented.

When the direction of the turn of the wrist is reversed, on the other hand, since the movable cover 40 moves in a direction apart from internal parts, the movable cover 40 can be backed to the predetermined position by the elastic force of the torsion coil spring 43.

In the case of the rotary motion, furthermore, the movable cover 40 begins to rotate in accordance with the rotation of the hand 51. In this case, the rotation of the hand 51 is not disturbed even if the movable cover 40 contacts with internal parts and inhibits the rotation of the hand 51. This is because the torque of the hand 51 exceeds the elastic force given by the torsion coil spring 43 and enables further rotation of the hand 51 from the position, where the rotation of the hand 51 is disturbed due to the contact with the internal parts of the hand 51.

Thereby, the occurrence of the inhibition of the rotation of the hand 51 due to the contact with the movable cover 40 can be prevented even in the case of the rotary motion, and the movable cover 40 can be backed to the predetermined position when the direction of the rotation of the hand 51 is reversed.

Although there have been disclosed what are the patent embodiment of the invention, it will be understood by person skilled in the art that variations and modifications may be made thereto without departing from the scope of the invention, which is indicated by the appended claims.

In the above described embodiment, for example, the first motor and the second motor are disposed at left-and-right of the central axis of the arm. The first motor and the second motor may be disposed with a shift in a direction along the central axis of the arm so that the output axis of each of the first motor and the second motor becomes parallel each other. In this case, the amplitude of the inertia moment can be controlled by shifting the weight of the motor to an elbow side from a fingertip side.

In the present embodiment, the third motor is disposed so that the output shaft thereof becomes parallel to the central axis of the rotary motion. The third motor may be disposed so that the output shaft thereof becomes orthogonal to the central axis of the rotary motion. In this case, the length of the arm can be shortened furthermore, and the amplitude of the inertia moment can be controllable.

In the above described embodiment, additionally, the rotary motion of the wrist of the humanoid type robot has been explained for explaining the present invention's joint structure. But, this invention is not limited to this, and can be applied for a rotator rotating continuously, e.g. the rotation of a drill, when applying this invention to a robot for an industrial use.

In the present embodiment, the third motor is disposed behind the first motor and the second motor. But the third motor may be disposed in front of the first motor and second motor. In this case, inertia moment around the elbow can also be controllable.

The inertia moment can be controllable by adjusting the position of each of the motors without changing the positional relation between respective motors. In the present invention, the appropriate modification may be acceptable in accordance with the use and the conditions. Thereby, the setting of inertia moment and weight balance can be enabled.

What is claimed is:

1. A joint structure to be connected to an assembly and a link of a robot, the joint structure comprising:
   a first motor configured to cause the assembly to swing in a longitudinal motion with respect to the link;
   a second motor configured to cause the assembly to swing in a lateral motion with respect to the link, wherein the first motor and the second motor are disposed so that the output shaft of the first motor and the output shaft of the second motor are parallel with each other and are orthogonal to the link;
   a first rotary unit is connected to the assembly;
   a second rotary unit configured to support the first rotary unit while allowing the rotation around a first axis of the first rotary unit;
   a base configured to support the second rotary unit while allowing the rotation around a second axis orthogonal to a first axis of the second rotary unit, wherein the first motor and the second motor are disposed on the base;
   a first swing lever is connected to an output shaft of the first motor, and configured to change the rotation of the output shaft of the first motor into a reciprocating motion;
   a joint is connected to the first swing lever and the first rotary unit, and configured to transfer the reciprocating motion to the first swing lever to rotate the first rotary unit around the first axis;
   a second swing lever is connected to an output shaft of the second motor, and configured to change a rotary motion of the output shaft of the second motor into a reciprocating motion; and
   a rod which is connected to the second swing lever and the second rotary unit, and configured to transfer the reciprocating motion to the second rotary unit to rotate the second rotary unit around the second axis.

2. A joint structure of a robot according to claim 1 further comprising:

a motor side pulley is connected to an output shaft of a third motor;

a driven pulley is connected to the base and configured to rotate the base around the central axis of the rotary motion; and a belt configured to transfer the rotation of the motor side pulley to the driven pulley.

* * * * *